(12) United States Patent
Moyer

(10) Patent No.: US 8,572,345 B2
(45) Date of Patent: Oct. 29, 2013

(54) MEMORY MANAGEMENT UNIT (MMU) HAVING REGION DESCRIPTOR GLOBALIZATION CONTROLS AND METHOD OF OPERATION

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 20 days.

(21) Appl. No.: 13/234,305

(22) Filed: Sep. 16, 2011

(65) Prior Publication Data
US 2013/0073827 A1 Mar. 21, 2013

(51) Int. Cl.
*G06F 12/00* (2006.01)
(52) U.S. Cl.
USPC .... 711/168; 711/152; 711/163; 711/E12.091; 711/E12.093
(58) Field of Classification Search
USPC ........... 711/152, 163, E12.091, E12.093, 168
See application file for complete search history.

(56) References Cited

U.S. PATENT DOCUMENTS

| | | | |
|---|---|---|---|
| 5,649,159 A | 7/1997 | Le et al. | |
| 5,987,557 A | 11/1999 | Ebrahim | |
| 6,564,311 B2 | 5/2003 | Kakeda et al. | |
| 6,598,050 B1 | 7/2003 | Bourekas | |
| 6,618,799 B2 | 9/2003 | Hagersten | |
| 6,810,471 B2 | 10/2004 | Fujii | |
| 2002/0199076 A1 | 12/2002 | Fujii | |
| 2010/0031876 A1 | 2/2010 | D'Evelyn | |
| 2010/0318761 A1 | 12/2010 | Moyer et al. | |

FOREIGN PATENT DOCUMENTS

| | | |
|---|---|---|
| EP | 0327839 B1 | 12/1995 |
| WO | 9849623 A1 | 11/1998 |

OTHER PUBLICATIONS

U.S. Appl. No. 13/182734, filed Jul. 14, 2011.
U.S. Appl. No. 13/033,327, filed Feb. 23, 2011.
EP Application No. 12180259.9, Extended International Search Report and Written Opinion mailed Jan. 3, 2013.

*Primary Examiner* — Yong Choe
(74) *Attorney, Agent, or Firm* — Joanna G. Chiu; Mary Jo Bertani

(57) ABSTRACT

Embodiments of computer processing systems and methods are provided that include a memory protection unit (MPU), and a plurality of region descriptors associated with the MPU. The region descriptors include address range and translation identifier values for a respective region of memory. Control logic determines whether a translation identifier control indicator is in a first state, and if the translation identifier control indicator is in the first state, the control logic allows a first process being executed by the processing system to access a memory region allocated to a second process being executed by the processing system.

19 Claims, 9 Drawing Sheets

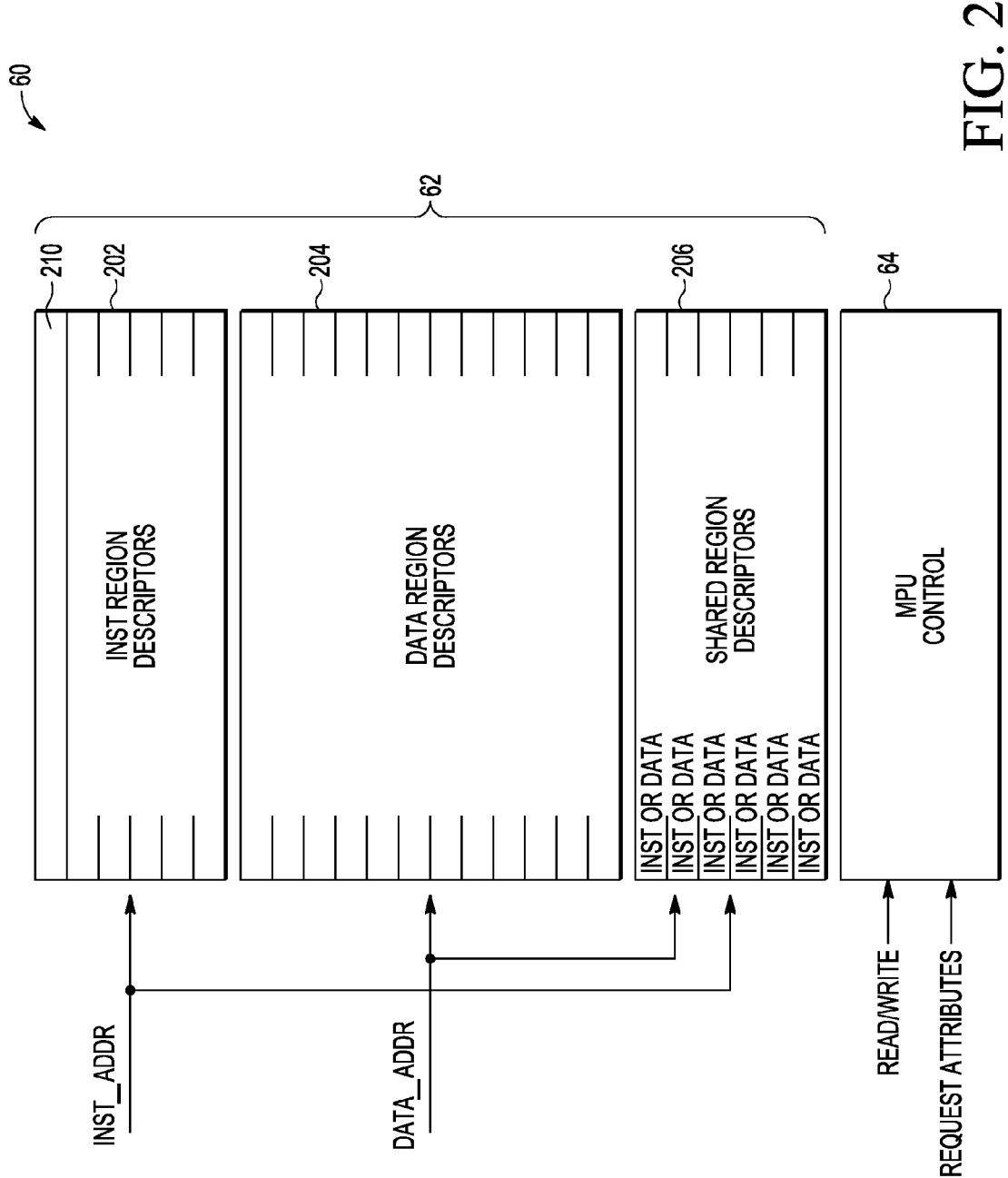

| FIELD | | COMMENTS |
|---|---|---|
| V | | VALID BIT FOR ENTRY |
| UPPER_BOUND | | UPPER ADDRESS BOUND (COMPARED AGAINST EFFECTIVE ADDRESS) |
| LOWER_BOUND | | LOWER ADDRESS BOUND (COMPARED AGAINST EFFECTIVE ADDRESS) |
| INST | | INSTRUCTION OR DATA ACCESS ENTRY (1=INST) |
| SX | SW | SR | SUPERVISOR EXECUTE, WRITE, AND READ PERMISSION BITS |
| UX | UW | UR | USER EXECUTE, WRITE, AND READ PERMISSION BITS |
| CI | | CACHE-INHIBITED ATTRIBUTE |
| G | | GUARDED ATTRIBUTE (NOT PRESENT IN DEDICATED INST ENTRIES) |
| TID | | REGION IDENTIFIER |
| RGC | | REGION GLOBALIZATION CONTROL |

FIG. 3

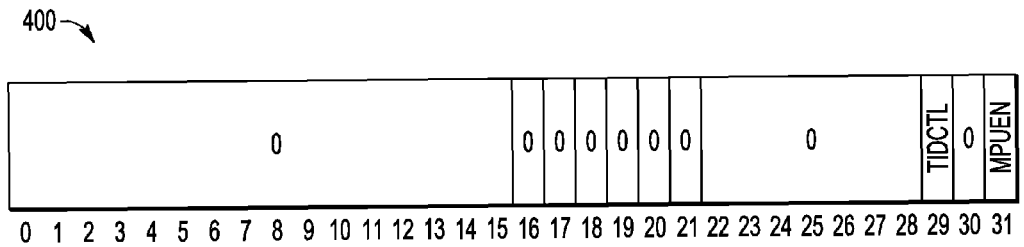

FIG. 4

| BITS | NAME | DESCRIPTION |
|---|---|---|
| 0:28 | - | RESERVED |
| 29 | TIDCTL | TID CONTROL<br>0 - TID COMPARISONS PERFORMED NORMALLY, NO GLOBALIZATION MASKING IS PERFORMED<br>1 - TID COMPARISONS ARE PERFORMED USING GLOBALIZATION MASKING WHILE IN SUPERVISOR MODE. MULTIPLE HITS ALLOW THE LEAST RESTRICTIVE ACCESS PERMISSIONS. |
| 30 | - | RESERVED |
| 31 | MPUEN | MPU ENABLE<br>0 - MPU IS DISABLED<br>1 - MPU IS ENABLED<br>THIS BIT ENABLES OPERATION OF THE MPU. WHEN ENABLED, ACCESS ADDRESSES ARE COMPARED TO EACH ENTRY IN THE MPU FOR A MATCH CONDITION. IF NO MATCH CONDITION OCCURS, AND THE ACCESS TYPE IS NOT ENABLED TO BYPASS THE MPU PROTECTIONS, THEN AN EXCEPTION CONDITION IS SIGNALED FOR THE ACCESS. |

FIG. 5

| BITS | NAME | DESCRIPTION |
|---|---|---|
| 0:15 | G_PID | GLOBALIZATION PID VALUE<br>WHEN TIDCTL IS SET TO '10', AND THE CURRENT PID VALUE MATCHES G_PID, TID COMPARISONS ARE PERFORMED USING GLOBALIZATION MASKING. |
| 0:21 | - | RESERVED |
| 28:29 | TIDCTL | TID USAGE CONTROL<br>    00 - TID COMPARISONS PERFORMED NORMALLY, NO GLOBALIZATION MASKING IS PERFORMED<br>    01 - TID COMPARISONS ARE PERFORMED USING GLOBALIZATION MASKING WHILE IN SUPERVISOR MODE. MULTIPLE HITS ALLOW THE LEAST RESTRICTIVE ACCESS PERMISSIONS.<br>    10 - TID COMPARISONS ARE PERFORMED USING GLOBALIZATION MASKING WHEN CURRENT PID VALUE MATCHES THE G_PID VALUE IN MPU0CSR0. MULTIPLE HITS ALLOW THE LEAST RESTRICTIVE ACCESS PERMISSIONS.<br>    11 - RESERVED |
| 30 | RGCEN | REGION GLOBALIZATION CONTROL ENABLED<br>    0 - RGC BITS IN REGION DESCRIPTORS ARE IGNORED WHEN GLOBALIZATION MASKING IS ENABLED<br>    1 - RGC BIT IN REGION DESCRIPTOR IS USED TO QUALIFY GLOBALIZATION OF THE DESCRIPTOR WHEN GLOBALIZATION MASKING IS ENABLED |
| 31 [63] | MPUEN | MPU ENABLE<br>    0 - MPU IS DISABLED<br>    1 - MPU IS ENABLED<br>THIS BIT ENABLES OPERATION OF THE MPU. WHEN ENABLED, ACCESS ADDRESSES ARE COMPARED TO EACH ENTRY IN THE MPU FOR A MATCH CONDITION. IF NO MATCH CONDITION OCCURS, AND THE ACCESS TYPE IS NOT ENABLED TO BYPASS THE MPU PROTECTIONS, THEN AN EXCEPTION CONDITION MAY BE SIGNALED FOR THE ACCESS. |

FIG. 8

MEMORY MANAGEMENT UNIT (MMU) HAVING REGION DESCRIPTOR GLOBALIZATION CONTROLS AND METHOD OF OPERATION

BACKGROUND

1. Field

This disclosure relates generally to data processing systems, and more specifically, to a memory management unit having region descriptor globalization controls.

2. Related Art

Some embedded processors implement an internal Memory Protection Unit (MPU) to provide protection information for a number of variable size memory regions. Access protections are enforced on instruction fetches and data read and write accesses by comparing these access addresses with each entry in the MPU to determine a match. A descriptor match for an access occurs when the access address lies within the address range defined by the region descriptor, the current process identifier (PID) matches the programmed region identifier defined by the region descriptor, and the permissions associated with the region descriptor allow the access type.

In one implementation of an MPU, a programmed region identifier of all 0's indicates a "global" region descriptor that can be matched by any process, and is usually used for supervisor-only regions. However, since supervisor access to user regions is also needed, this implementation typically requires multiple redundant region descriptors or requires the supervisor code to modify the current PID value to match the programmed region identifier. However, these solutions introduce penalties in terms of resource usage or performance overhead. Furthermore, due to other mapping constraints, it may not be possible to change the current PID value in supervisor mode to match a user-region PID value.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 2 illustrates, in block diagram form, a memory protection unit (MPU) in the data processing system of FIG. 1, in accordance with one embodiment of the present invention.

FIG. 3 illustrates, in table form, a region descriptor in the MPU of FIG. 2, in accordance with one embodiment of the present invention.

FIG. 4 illustrates, in diagrammatic form, an MPU control and status register useable in the MPU of FIG. 2, in accordance with one embodiment of the present invention.

FIG. 5 illustrates, in table form, descriptions for various fields of the MPU control and status register of FIG. 4, in accordance with one embodiment of the present invention.

FIG. 8 illustrates, in table form, descriptions for various fields of the MPU control and status register of FIG. 7, in accordance with one embodiment of the present invention.

DETAILED DESCRIPTION

Dynamic globalization of region descriptors of a memory management unit (MPU) may be allowed through the use of various control mechanisms. For example, in one embodiment, globalization logic may be implemented which masks the effective region ID of all or selected region descriptor entries within the MPU. In one example, this masking may temporarily force the effective region ID of a region descriptor entry to all 0's (or some other predetermined value) to effect "globalization" of the region descriptor entry. Alternatively, the masking may result in the current process ID needing to match a global ID rather than the region ID programmed into a region descriptor. Therefore, a current process operating in an appropriate state of the processor (such as operating in supervisor mode or having a specific process identifier value) may gain access to a region defined by a region descriptor entry, without having to match the specific region ID of the region descriptor entry. In this manner, a current process may access a memory region which is allocated, by a region descriptor entry corresponding to that memory region, to a different process.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Figure 1:
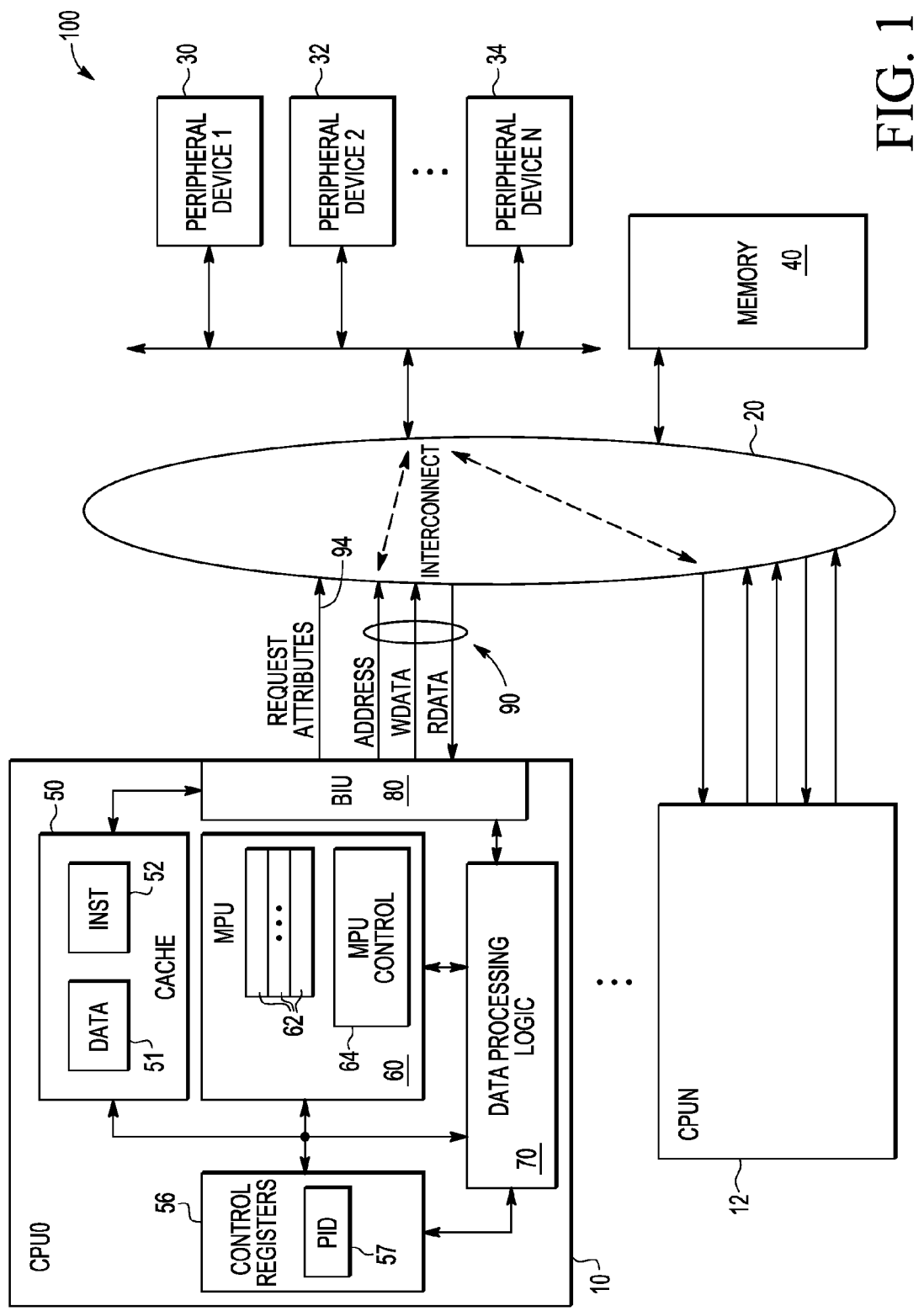
FIG. 1 illustrates, in block diagram form, a data processing system in accordance with one embodiment of the present invention.

FIG. 1 is a block diagram illustrating a data processing system 100 in accordance with an embodiment of the present disclosure. Data processing system 100 includes a first processor 10 identified as CPU 0, a second processor core 12 identified as CPU N, an interconnect 20, a memory device 40, and peripheral devices 30, 32, 34. Processor 10 includes a cache 50, which further includes a data cache 51 and an instruction cache 52; an MPU 60, which further includes region descriptors 62 and an MPU control module 64; a data processing logic module 70; control registers 56, which further includes storage circuitry 57 which stores the current process identifier (PID); and a bus interface unit (BIU) 80. Processor 12 includes similar sub-components (not shown), and each processor can include additional modules (not shown for clarity).

Memory access protection policies can be implemented by one or more memory protection units (MPUs) 60 included in data processing system 100. During operation of data processing system 100, data processing logic module 70 at a processor 10, 12 may issue a request to access a location in memory 40. For example, data processing logic module 70 may issue a request to retrieve a program instruction or data information from memory 40, or to store data information to memory 40. Memory access protection policies determine whether to allow or deny the requested access. If two region descriptors within a memory protection unit have overlapping address ranges in an area in memory and have conflicting access policies, a default access policy may be implemented.

In the illustrated embodiment of FIG. 1, data processing system 100 is a general purpose data processing device that can be incorporated into any of a number of electronic systems, including portable electronic devices, computer devices, automotive devices, communications devices, and the like. Processors 10,12 include circuitry configured to execute software and thereby perform a desired task.

A memory access request is typically associated with execution of a load instruction to retrieve information from a particular location in memory 40, or execution of a store instruction to write information to a particular location in memory 40. An address accompanies the memory access request to identify a location within a memory to be accessed. A load or store instruction can be included in a software program, and the software program can be executed in a supervisor mode or in a user mode. The execution of a software program can be referred to as a process, and a read or write access request can be associated with a current process identifier value (PID) assigned to the particular process being executed. This PID may be stored in storage circuitry 57 within control registers 56.

Information accessed during a memory read operation can include instructions or can include data information, while information associated with a memory write operation is generally data information. Accordingly, memory access requests can be characterized based on values of one or more request attributes. Examples of request attributes include an address attribute for indicating an address of a location to be accessed; a read attribute for indicating whether or not a request is a read request; a write attribute for indicating a whether or not a request is a write request; a supervisor attribute for indicating whether or not a request is issued in supervisor mode; a user attribute for indicating whether or not a request is issued in user mode, a process identification (PID) attribute for identifying a process associated with a request; an instruction attribute for indicating whether or not the requested information is an instruction; and the like. Any number of request attributes can be included in region descriptors 62 and associated with a memory access request.

As used herein, a memory location is intended to refer to any data storage location having a unique system address. Such locations, including memory devices 40, peripheral devices 30, 32, 34, and the like, are included within a system address space. Similarly, the phrase memory access request is used herein to refer to any request to access a storage location based on a unique system address. For simplicity, memory-mapped storage locations and corresponding access requests described herein are referred to as memories and memory access requests, respectively.

Processors 10, 12 can communicate with memory 40 and peripherals 30-34 via interconnect 20. In particular, interconnect 20 may conduct signals to provide REQUEST INFORMATION 90 and REQUEST ATTRIBUTES 94. The REQUEST INFORMATION 90 includes a memory address (ADDRESS), write data (WDATA), and read data (RDATA). Memory device 40 can provide storage locations accessible via memory access requests issued by processor 10 or processor 12. Memory device 40 can include any of a variety of memory types, including dynamic random access memory (DRAM), static random access memory (SRAM), and the like. For clarity, FIG. 1 omits other components of data processing system 100 whose operation is well known to those of ordinary skill in the art, such as high-level cache memory devices, external interfaces, and the like. Furthermore, data processing system 100 can include a greater or a fewer number of processors.

During operation, processors 10 and 12 can access memory 40 to obtain instructions, to retrieve data information, or to store data information. For example, data processing logic module 70 in processor 10 may issue a memory access request to retrieve data information at a particular memory address at memory 40. Before transmitting the memory access request external to processor 10, MPU 60 can determine if the requesting device (or the software process from which the request originates) possesses suitable permissions to allow the access. Furthermore, processor 10 can determine whether the desired data information is available within data cache 51. If MPU 60 determines that the request is allowed, and the desired data information is not present in data cache 51 (a cache miss), the memory access request is provided to BIU 80. BIU 80 is configured to forward the memory access request over interconnect 20 to memory 40 or peripherals 30, 32, 34.

BIU 80 can initiate a memory-read access request by transmitting a memory address via signal ADDRESS, a read command signal (not shown), and REQUEST ATTRIBUTES 94 identifying values of other attributes associated with the request. These signals are propagated via interconnect 20 to memory 40. Memory device 40 can return the requested data information to BIU 80 and then data processing logic module 70 via the signal RDATA over interconnect 20.

In a similar manner, data processing logic module 70 at processor 10 may issue a memory access request to store data information to a particular memory address at memory 40. Before transmitting the memory access request external to processor 10, MPU 60 can determine whether to allow or deny the access based on values of request attributes associated with the request. If MPU 60 determines that attributes accompanying the request meet the requirements of attributes maintained by MPU 60, the memory access request is provided to BIU 80.

BIU 80 can initiate a memory-write access request by transmitting a memory address via signal ADDRESS, the data information to be stored at memory 40 via the signal WDATA, a write command signal (not shown), and REQUEST ATTRIBUTES 94 identifying privileges associated with the request.

A memory access request to read or to write to memory 40 can include additional information that can be communicated to memory 40 via the signal REQUEST ATTRIBUTES 94 to indicate various request attributes associated with the access request. REQUEST ATTRIBUTES 94 can include information identifying the source of the request and the type of the request, as described above. For example, REQUEST ATTRIBUTES 94 can include an indication that the request is associated with a process running in supervisor mode or user mode, an indication that the request is to perform a read operation or a write operation, and the like. REQUEST ATTRIBUTES 94 can include other information that can further characterize an associated memory access request in a particular way.

As described above, an MPU, such as MPU 60 can maintain respective permission information associated with one or more address regions. MPU 60 enforces protections on instruction fetches and data read and write accesses by comparing a memory address and a process ID (PID) associated with the memory access request with each entry in MPU 60 (stored within a region descriptor 62) to determine a match. If MPU 60 identifies a matching region descriptor 62 corresponding to the memory address, attributes included in that region descriptor 62 can be evaluated. Attributes can relate to any number of request attributes that together define aspects of a protection policy. For example, a region descriptor can designate that locations included within a particular memory address region are write protected, in which case a request to store information, e.g., a request with an attribute that indicates information is to be stored, at a location within the region is denied while a request to retrieve information, e.g., a request with an attribute that indicates information is to be read, from a location within the region is allowed. Similarly, a region descriptor 62 can designate that locations included within a memory address region are accessible only to access requests associated with an attribute that indicates the access request was issued by a process running in supervisor mode.

The operation of MPU 60 may be better understood with reference to FIGS. 2 and 3. FIG. 2 is a block diagram illustrating MPU 60 in accordance with a specific embodiment of the present disclosure. MPU 60 includes a set of instruction region descriptors 202, a set of data region descriptors 204, and a set of shared (instruction or data) region descriptors 206. MPU 60 also includes an MPU control module 64. MPU control module 64 operates to selectively allow or deny each requested memory access based on an address and privilege attributes associated with the request, based on whether the access is an instruction fetch access, a read access, or a write access, and based on the contents of one or more region descriptors included in region descriptors 202, 204, and 206. As previously described, REQUEST ATTRIBUTES 94 can include an indication of whether the device or software process initiating the access request has supervisor privileges or instead has only user privileges, and may include other attributes, such as a bus master identification number and the like. If a memory access request is denied, MPU control module 64 can return a termination error response to the requesting device indicating that a memory access exception has occurred.

FIG. 3 is a table illustrating an embodiment of a region descriptor 300, which may correspond to any of region descriptors 202, 204, or 206, in accordance with a specific embodiment of the present disclosure. Region descriptor 300 (which may also be referred to as a region descriptor entry) includes a plurality of fields, 320-331. Field 320 relates to a validity attribute, V. A region descriptor is invalid if a corresponding valid bit is not asserted. If the valid bit is asserted, the address range associated with the region descriptor includes the address associated with a request, and the region identifier associated with the region descriptor matches the PID associated with the request, then permission information included in the region descriptor can be considered in response to a memory access request.

Fields 321, UPPER BOUND, and 322, LOWER BOUND, relate to an upper-bound address attribute and a lower-bound address attribute, respectively, for indicating a relevant address range of the region descriptor.

Field 325 relates to an instruction attribute, INST, which can be asserted to identify that the region descriptor is only valid for instruction accesses, e.g., access requests wherein a corresponding instruction request attribute is also asserted. Accordingly, a corresponding instruction attribute is asserted in region descriptors included in set 202 (instruction region descriptors), and negated in region descriptors included in set 204 (data region descriptors).

Field 326 relates to a plurality of accessibility attributes including a SX attribute (supervisor execute), a SW attribute (supervisor write), and a SR attribute (supervisor read), which can be individually asserted to identify the types of supervisor level access requests that are allowed by the region descriptor to locations included within the address region specified by the region descriptor. For example, if the SW attribute is asserted, an access request identified as both a supervisor access and a write access (by assertion of corresponding request attributes accompanying the request) is permitted by the descriptor to store information to locations within the associated memory address region. Similarly, if the SR attribute is asserted, an access request identified as both a supervisor access and a read access is permitted by the descriptor to read locations with the associated region. Attribute SX identifies whether locations within the associated region can be executed.

Field 327 relates to a plurality of accessibility attributes including a UX attribute (user execute), a UW attribute (user write), and a UR attribute (user read), which individually identify the types of user level access requests that are permitted by the descriptor to locations corresponding to the region descriptor.

Field 328 relates to a cache-inhibit region attribute, CI. The cache-inhibit region attribute can be asserted to instruct a requesting device to not store information retrieved from locations within the associated region in a cache device, such as data cache 51 and instruction cache 52 of FIG. 1.

Field 329 relates to a guarded region attribute, G. The guarded region attribute can be asserted to indicate that locations included within the associated region operate differently than a normal memory element or register. For example, a memory mapped location whose value can change following or in response to an access, such as a FIFO, a volatile storage element, and the like. Accordingly, information associated with a guarded location typically is not stored in a cache memory device.

Field 330, TID, relates to a region identifier for the region descriptor. (Note that TID may be referred to as a translation identifier.) As described above, a received request matches a region descriptor when the valid bit of the region descriptor is asserted, the access address corresponding to the received request falls within the address range indicated by the UPPER_BOUND and LOWER_BOUND of the region descriptor, and if the PID value corresponding to the received request matches the TID. As will be discussed below, it may be useful to "globalize" the TID such that, under certain circumstances, the PID value corresponding to the received request need not match the TID for a match to be indicated. In this manner, the TID may be masked under various conditions using one or more controls, as will be described in more detail below.

Field 331, RGC, relates to a region globalization control for the region descriptor. The RGC allows for finer granularity for globalization. For example, it may be used to indicate to which region descriptors to apply globalization controls. In this manner, if the RGC is asserted for a region descriptor, globalization controls (i.e. masking controls) apply, but if the RGC is not asserted, globalization controls do not apply, and the TID is used in determining whether or not a match occurs. This field may or may not be present in the region descriptors.

During operation of MPU 60, a memory access request generated by data processing logic 70 can be evaluated to determine an address of a location to be accessed, a PID associated with the request (which can be obtained from storage circuitry 57), whether the requested processor or process access request has supervisor or user privileges, whether the request is a read access or a write access, and whether the request is for an instruction access or a data access. Region descriptors 202, 204, and 206 can include additional fields corresponding to other request attributes or to identify or further qualify an access request in a desired way. MPU 60 can examine each valid region descriptor of the appropriate sector or sectors (e.g. instruction region descriptors and shared region descriptors for instruction access requests, and data region descriptors and shared region descriptors for data access requests). If MPU 60 identifies a region descriptor that matches the incoming access request, MPU 60 either allows or denies the access based on the request attributes and based on permissions specified by the matching region descriptor. For example, if a user-mode request to write to address XYZ is received, and a valid region descriptor defines an address region that includes address XYZ and the PID associated with the memory access request has a value which matches the TID of the valid region descriptor, the requested access can be allowed if the UW attribute is asserted, and denied if the UW attribute is not asserted. Furthermore, if the memory access is allowed, the memory access can be performed as a cache-inhibited access or a guarded access based on the values of the CI and G fields in the matching region descriptor, respectively. If more than one valid region descriptor matches the requested access address and corresponding PID, any policy may be utilized to determine which region descriptor or portions of the region descriptor govern the access. For example, the least restrictive access permissions of the multiple matching region descriptors may be used.

As discussed above, it may be desirable to allow supervisor level software to access its own sections of code (e.g. supervisors-only regions in memory) independently of the current running process (i.e. independent of the PID value). Furthermore, in addition to accessing these supervisor-only regions in memory, it may also be desirable to allow supervisor access to user regions; however, each particular user region defined by MPU 60 is tied to a PID value. Therefore, in one embodiment, a globalization control mechanism is included to allow the TID of a region descriptor whose address range includes the address of the access request to be temporarily forced to 0's (or to another predetermined value) to allow for a match, regardless of the actual stored TID value. This may be done, for example, in the case of supervisor mode only and not user mode. Therefore, in one embodiment, MPU 60 provides the capability of global masking the TID bits in all region descriptors (or a subset of region descriptors) to 0 when performing the PID/TID portion of the address range comparison for the entry while in supervisor mode. This may be done by way of setting a control bit in an MPU control register.

FIG. 4 illustrates, in diagrammatic form, an example of an MPU control and status register 400 having a number of fields, including a global masking control field, TIDCTL, and an MPU enable field, MPUEN. (Note that the TIDCTL field may be referred to as a translation identifier control indicator, and MPU control and status register 400 may be referred to as the MPU0CSR0.) In the example of FIG. 4, the TIDCTL field is a one bit field located at bit 29 and the MPUEN field is a one bit field located at bit 31. The remainder of the bits in the 32-bit register of FIG. 4 are reserved and may be used for other control or status information. Note that alternate embodiments may arrange the MPU control and status register differently and may include more or fewer fields than illustrated. In one embodiment, MPU control and status register 400 is located within MPU control 64.

FIG. 5 provides, in table form, descriptions for the TIDCTL field and the MPUEN field. With respect to the MPUEN field, if the MPUEN bit is asserted (a logic level one), then MPU 60 is enabled, otherwise, if negated (a logic level zero), then MPU 60 is disabled. This bit therefore enables operation of MPU 60. When enabled, access addresses are compared to each entry in MPU 60 for a match condition. If no match condition occurs, and the access type is not enabled to bypass the MPU protections, than an exception condition may be signaled for the access. With respect to the TIDCTL field, if the TIDCTL field is negated (a logic level zero), then the TID comparisons are performed normally and no globalization masking is performed. That is, in this case, for a match condition to occur with a valid region descriptor of MPU 60, the access address has to fall within the address range of the valid region descriptor and the PID of the access has to match the TID of the valid region descriptor. If the TIDCTL field is asserted (a logic level one), then the TID comparisons are performed using globalization masking while in supervisor mode. Furthermore, for multiple hits (i.e. if multiple region descriptors result in a match condition), the least restrictive access permissions of the matching descriptors is used. In the current embodiment, when the TIDCTL bit is asserted, the TID bits in all region descriptors are masked when performing the PID/TID comparison while in supervisor mode (but not in user mode).

By asserting the TIDCTL bit such that the TID comparisons are performed using masking while in supervisor mode, supervisor code is allowed to utilize region descriptors initially loaded for user tasks regardless of the programmed TID value in those descriptors. This capability may be used in certain situations to minimize the number of supervisor region descriptors required to be active, and thus may improve efficiency. Furthermore, the actual contents in the region descriptors is not changed. That is, the TID values remain as programmed and are only masked to 0 or other predetermined value at the comparison logic.

Figure 6:
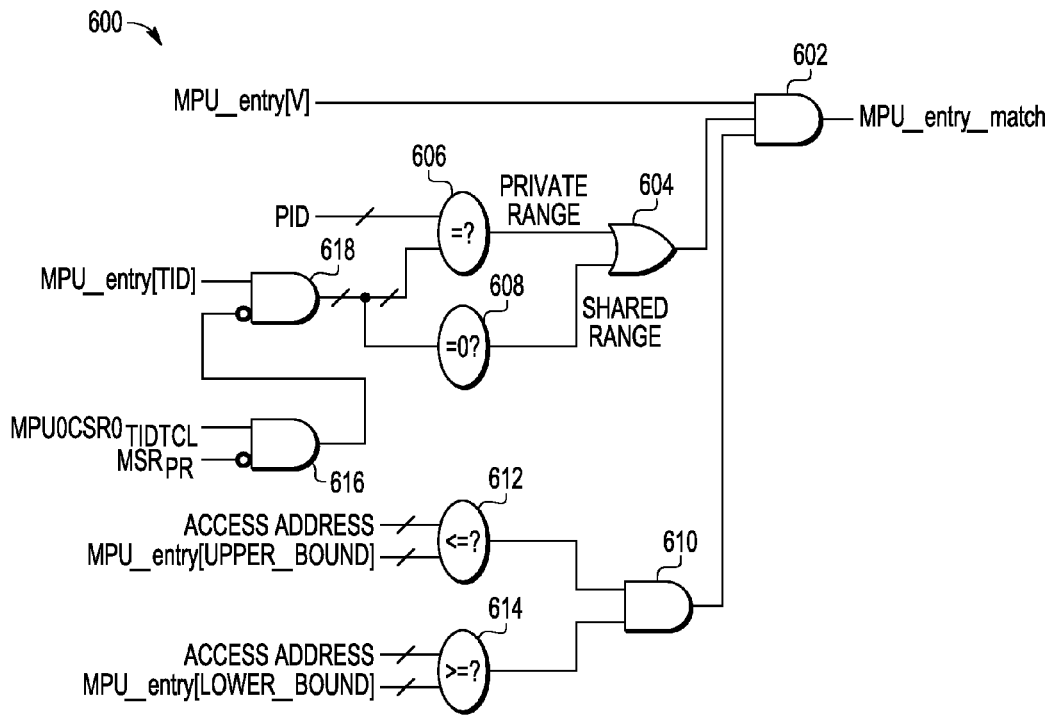
FIG. 6 illustrates region descriptor match logic for a region descriptor entry of the MPU of FIG. 2, in accordance with one embodiment of the present invention.

FIG. 6 illustrates, in partial schematic and partial block diagram form, region descriptor match logic 600 for an access address and its attributes and how it is compared with the corresponding fields in an MPU entry. Therefore, region descriptor match logic 600 may also be referred to as the comparison logic and is repeated for each region descriptor entry in MPU 60. Match logic 600 includes AND gates 618, 616, 610 and 602, OR gate 604, and comparators 612, 614, 606 and 608. A first input of AND gate 602 is coupled to receive the valid bit from the corresponding region descriptor entry (MPU_entry[V]), a second input is coupled to an output of OR gate 604, and a third input is coupled to an output of AND gate 610. An output of AND gate 602 provides a match signal, MPU_entry_match, which indicates whether or not a match condition occurs. For example, if the match signal goes high (to a logic level one), a match for that region descriptor entry has occurred, and if the match signal stays low or goes low (to a logic level zero), a match has not occurred. A first input of OR gate 604 is coupled to an output of comparator 606 and a second input of OR gate 604 is coupled to an output of comparator 608. Comparator 606 has a first input coupled to receive the PID of a current access request (which may be provided by, for example, storage circuitry 57) and has a second input coupled to an output of AND gate 618. AND gate 618 has a first n-bit input coupled to receive the TID value from the corresponding region descriptor entry (MPU_entry[TID]). A second input of AND gate 618 is an inverting input coupled to an output of AND gate 616. A first input of AND gate 616 is coupled to receive the TIDCTL value from MPU control and status register 400 and a second input of AND gate 616 is an inverting input coupled to receive a supervisor/user mode indicator (MSR[PR]). This may correspond to the problem state (PR) of a machine state register (MSR) which may be located, for example, in control registers 56. In the embodiments described herein, a value of 0 for MSR[PR] indicates supervisor mode and a value of 1 indicates user mode. Comparator 608 has a first input coupled to the output of AND gate 618. AND gate 610 has a first input coupled to an output of comparator 612 and a second input coupled to an output of comparator 614. Comparator 612 has a first input coupled to receive the access address of the memory access request and a second input coupled to receive the upper_bound value from the corresponding region descriptor entry (MPU_entry[UPPER_BOUND]). Comparator 614 has a first input coupled to receive the access address of the memory access request and a second input coupled to receive the lower_bound value from the corresponding region descriptor entry (MPU_entry[LOWER_BOUND]).

In operation, match logic 600 determines if a match occurs with respect to a received memory access request and the corresponding region descriptor entry. Match logic 600 asserts the output match signal (MPU_entry_match) only if the valid bit is asserted (MPU_entry[V] is a logic level one), and the outputs of each of gates 604 and 610 are a logic level one. The output of AND gate 610 is high (a logic level one) when the access address of the received memory access request falls within the address range indicated by the upper and lower bounds of the region descriptor entry. That is, comparator 612 checks to see if the access address is less than the upper_bound, and, if so, asserts its output to a logic level one, and comparator 614 checks to see if the access address is greater than the lower_bound, and, if so, asserts its output to a logic level one. Only if both comparisons result in assertions of the outputs to a logic level one is the output of gate 610 a logic level one.

The PID/TID comparison portion, as well as the selective globalization masking, is implemented by OR gate 604 and the logic driving OR gate 604. If the TIDCTL bit is a logic level 0, meaning TID comparisons are to be performed normally, then the output of AND gate 616 is a logic level 0, and the TID value is provided to the n-bit output of AND gate 618 to comparators 606 and 608. However, if the TIDCTL bit is a logic level 1, TID comparisons are masked when in supervisor mode. Therefore, if MSR[PR] is a logic level 1, indicating user mode, then, due to the inversion at the second input of AND gate 616, the output of AND gate 616 is a logic level zero. In this case, the value of TID is provided, unmasked via AND gate 618, to comparators 606 and 608. However, if MSR[PR] is a logic level 0, indicating supervisor mode (and TIDCTL is a logic level 1), the output of AND gate 616 is a logic level one, and due to its inversion at the second input of AND gate 618, the output of AND gate 618 is forced to all zeros. Therefore, a value of all zeros, rather than the TID value, is provided to comparators 606 and 608. If the TID value was passed through by AND gate 618, then it is compared to the PID by comparator 606 to determine if a match occurs. A favorable comparison (i.e. a match) results in the output of comparator 606 going high (to a logic level one) and a non-favorable comparison results in the output of comparator 606 going low (to a logic level zero). Therefore, if the PID matches the TID value, the output of OR gate 604 goes high, regardless of the output of comparator 608, and a private address range is indicated. However, if the TID value is forced to all 0's by AND gate 618, the output of comparator 606 goes low to indicate a non-favorable comparison, but the output of comparator 608 goes high to indicate a favorable comparison (i.e. a match). In this case, a shared range is indicated due to the masking of TID. So long as either the output of comparator 606 goes high or 608 goes high, the PID/TID portion of the comparison results in a match.

Note that, in the descriptions of the example in FIGS. 4 and 5, when the TIDCTL bit is asserted, the TID bits in all region descriptors are masked when performing the PID/TID comparison while in supervisor mode However, in an alternate embodiment, each region descriptor may include an RGC field (as was described above in reference to FIG. 3) such that the TID bits in those region descriptors whose RGC field is asserted (e.g. a logic level one) are masked while performing the PID/TID comparison, and the TID bits in those regions descriptors whose RGC field is negated (e.g. a logic level zero) are not masked. Modifications may be made to match logic 600 accordingly, in order to allow for the TIDCTL to apply to selected region descriptors as indicated by the RGC fields.

Figure 7:
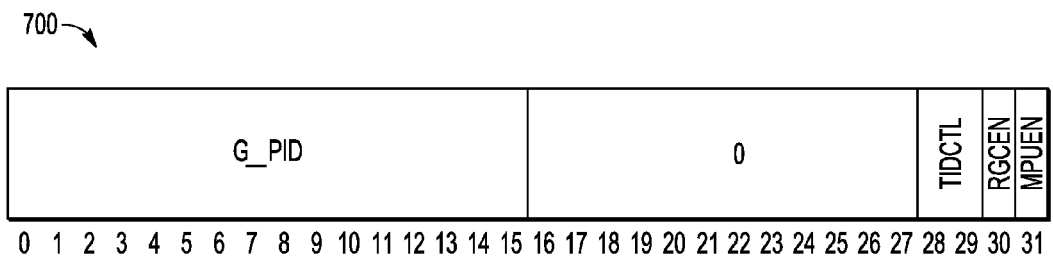
FIG. 7 illustrates, in diagrammatic form, an MPU control and status register useable in the MPU of FIG. 2, in accordance with one embodiment of the present invention.

FIG. 7 illustrates, in diagrammatic form, another example of an MPU control and status register 700 having a number of fields, including a globalization PID value, G_PID, global masking control field, TIDCTL, a region globalization control enabled field, RGCEN, and an MPU enable field, MPUEN. (Note that the TIDCTL field may be referred to as a translation identifier control indicator, and MPU control and status register 700 may be referred to as the MPU0CSR0.) In the example of FIG. 7, the G_PID field is a 16-bit field located at bits 0-15, the TIDCTL field is a multiple bit field (2-bit, in this example) located at bits 28 and 29, the RGCEN field is a one bit field located at bit 30, and the MPUEN field is a one bit field located at bit 31. The remainder of the bits in the 32-bit register of FIG. 7 are reserved and may be used for other control or status information. Note that alternate embodiments may arrange the MPU control and status register differently and may include more or fewer fields than illustrated. In one embodiment, MPU control and status register 700 is located within MPU control 64.

FIG. 8 provides, in table form, descriptions for the G_PID field, the TIDCTL field, the RGCEN field, and the MPUEN field. With respect to the MPUEN field, if the MPUEN bit is asserted (a logic level one), then MPU 60 is enabled, otherwise, if negated (a logic level zero), then MPU 60 is disabled. This bit therefore enables operation of MPU 60. When enabled, access addresses are compared to each entry in MPU 60 for a match condition. If no match condition occurs, and the access type of is not enabled to bypass the MPU protections, than an exception condition may be signaled for the access. With respect to the TIDCTL field, if the TIDCTL field is 00, then the TID comparisons are performed normally and no globalization masking is performed. That is, in this case, for a match condition to occur with a valid region descriptor of MPU 60, the access address has to fall within the address range of the valid region descriptor and the PID of the access has to match the TID of the valid region descriptor. If the TIDCTL field is 01, then the TID comparisons are performed using globalization masking while in supervisor mode. Furthermore, for multiple hits (i.e. if multiple region descriptors result in a match condition), the least restrictive access permissions of the matching descriptors is used. Therefore, note that when TID is 00 or 01, MPU 60 operates as was described above with respect to FIGS. 5 and 6 with TID being 0 or 1, respectively. If the TIDCTL field is 10, then the TID comparisons are performed using globalization masking when the current PID value matches the G_PID value stored in MPU status and control register 700. Also, for multiple hits in this case, the least restrictive access permissions of the matching descriptors is used.

Still referring to FIG. 8, if the RGCEN field has a value of 0, the RGC field in region descriptors are ignored when globalization masking is enabled. In this manner, when globalization masking is enabled, all region descriptors of MPU 60 are masked accordingly (such as by masking the TID bits when performing the PID/TID comparison in supervisor mode or by comparing the current PID to the G_PID rather than the TID of the particular descriptor). If the RGCEN field has a value of 1, the RGC field in the region descriptors is used to qualify globalization of the descriptor when globalization masking is enabled. That is, in one embodiment, only those region descriptors whose RGC field is asserted (e.g. a logic level one) would be masked by the globalization masking, while, for those region descriptors whose RGC field is negated (a logic level zero), a comparison between the current PID and the TID of the descriptor would be performed normally.

Figure 9:
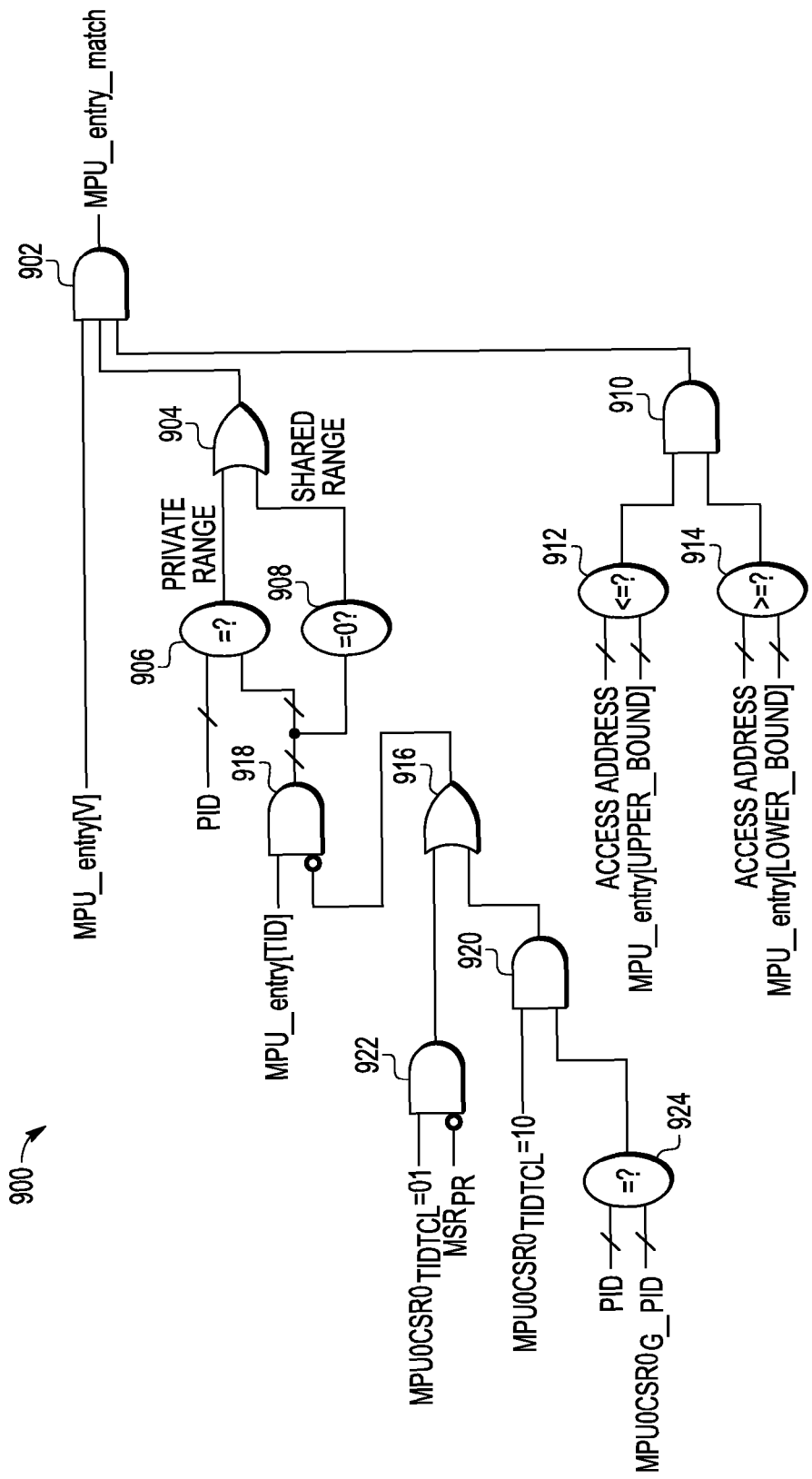
FIG. 9 illustrates region descriptor match logic for a region descriptor entry of the MPU of FIG. 2, in accordance with one embodiment of the present invention.

FIG. 9 illustrates, in partial schematic and partial block diagram form, region descriptor match logic 900 for an access address and its attributes and how it is compared with the corresponding fields in an MPU entry. Therefore, region descriptor match logic 900 may also be referred to as the comparison logic and is repeated for each region descriptor entry in MPU 60. The example of FIG. 9 includes use of the G_PID field to control globalization enabling, but does not include use of the RGCEN. Match logic 900 includes AND gates 922, 920, 918, 910, and 902, OR gates 916 and 904, and comparators 924, 912, 914, 906, and 908. A first input of AND gate 902 is coupled to receive the valid bit from the corresponding region descriptor entry (MPU_entry[V]), a second input is coupled to an output of OR gate 904, and a third input is coupled to an output of AND gate 910. An output of AND gate 902 provides a match signal, MPU_entry_match, which indicates whether or not a match condition occurs. For example, if the match signal goes high (to a logic level one), a match for that region descriptor entry has occurred, and if the match signal stays low or goes low (to a logic level zero), a match has not occurred. A first input of OR gate 904 is coupled to an output of comparator 906 and a second input of OR gate 904 is coupled to an output of comparator 908. Comparator 906 has a first input coupled to receive the PID of a current access request (which may be provided by, for example, storage circuitry 57) and has a second input coupled to an output of AND gate 918. AND gate 918 has a first n-bit input coupled to receive the TID value from the corresponding region descriptor entry (MPU_entry[TID]). A second input of AND gate 918 is an inverting input coupled to an output of OR gate 916. A first input of OR gate 916 is coupled to an output of AND gate 922. A first input of AND gate 922 is coupled to receive a first indicator, which, when asserted to a logic level one, indicates that the 2-bit value of the TIDCTL field from MPU control and status register 700 is "01". Therefore, if the value of the TIDCTL field is not "01", the first indicator is a logic level zero. A second input of AND gate 922 is an inverting input coupled to receive a supervisor/user mode indicator (MSR[PR]). This may correspond to the problem state (PR) of a machine state register (MSR) which may be located, for example, in control registers 56. In the embodiments described herein, a value of 0 for MSR[PR] indicates supervisor mode and a value of 1 indicates user mode. A second input of OR gate 916 is coupled to an output of AND gate 920. A first input of AND gate 920 is coupled to receive a second indicator, which, when asserted to a logic level one, indicates that the 2-bit value of the TIDCTL field from MPU control and status register 700 is "10". Therefore, if the value of the TIDCTL field is not "10", the second indicator is a logic level zero. A second input of AND gate 920 is coupled to an output of comparator 924. Comparator 924 has a first input coupled to receive the current PID (such as from storage circuitry 57) and a second input coupled to receive the G_PID value from MPU control and status register 700. Comparator 608 has a first input coupled to the output of AND gate 918. AND gate 910 has a first input coupled to an output of comparator 912 and a second input coupled to an output of comparator 914. Comparator 912 has a first input coupled to receive the access address of the memory access request and a second input coupled to receive the upper_bound value from the corresponding region descriptor entry (MPU_entry[UPPER_BOUND]). Comparator 914 has a first input coupled to receive the access address of the memory access request and a second input coupled to receive the lower_bound value from the corresponding region descriptor entry (MPU_entry[LOWER_BOUND]).

In operation, match logic 900 determines if a match occurs with respect to a received memory access request and the corresponding region descriptor entry. Match logic 900 asserts the output match signal (MPU_entry_match) only if the valid bit is asserted (MPU_entry[V] is a logic level one), and the outputs of each of gates 904 and 910 are a logic level one. The output of AND gate 910 is high (a logic level one) when the access address of the received memory access request falls within the address range indicated by the upper and lower bounds of the region descriptor entry. That is, comparator 912 checks to see if the access address is less than the upper_bound, and, if so, asserts its output to a logic level one, and comparator 914 checks to see if the access address is greater than the lower_bound, and, if so, asserts its output to a logic level one. Only if both comparisons result in assertions of the outputs to a logic level one is the output of gate 910 a logic level one.

The PID/TID comparison portion, as well as the selective globalization masking, is implemented by OR gate 904 and the logic driving OR gate 904. If the TIDCTL field is 00, meaning TID comparisons are to be performed normally, then the output of OR gate 916 is a logic level 0, and the TID value is provided to the n-bit output of AND gate 918 to comparators 906 and 908. That is, if TIDCTL is 00, then it is neither 01 nor 10, thus the inputs to OR gate 916 are logic level zeros. If the TIDCTL field is a logic level 01, TID comparisons are masked when in supervisor mode. Therefore, if MSR[PR] is a logic level 1, indicating user mode, then, due to the inversion at the second input of AND gate 922, the output of AND gate 922 is a logic level zero. Also, if the TIDCTL field is a logic level 01, then the first input to AND gate 920 is zero and the output of AND gate 920 is zero. Therefore, the output of OR gate 916 is zero and the value of TID is provided, unmasked via AND gate 918, to comparators 606 and 608. However, if MSR[PR] is a logic level 0, indicating supervisor mode (and the TIDCTL field is 01), the output of AND gate 922 is a logic level one. In this case, the output of OR gate 916 is also one, and, due to its inversion at the second input of AND gate 918, the output of AND gate 918 is forced to all zeros. Therefore, a value of all zeros, rather than the TID value, is provided to comparators 906 and 908. Note that in this case, the second input to OR gate 916 is also zero. If, however, the TIDCTL field is 10, then globalization masking is performed using the G_PID value. In this case, the first input to AND gate 920 is a logic level 1 and comparator 924 compares the current PID value to the G_PID value from MPU control and status register 700. If there's a match, the output of comparator 924 goes to a logic level one, and the output of AND gate 920 goes to a logic level one. In this case the first input to OR gate 916 is a logic level zero (since TIDCTL is 10) and the second input of OR gate 916 is a logic level one. Therefore, the output of OR gate 916 is also one, and, due to its inversion at the second input of AND gate 918, the output of AND gate 918 is forced to all zeros. OR gate 916 detects if the appropriate conditions are met for globalization masking to occur in accordance with TIDCTL being 01 or 10. If globalization masking is to occur, the TID value is forced to all zeros, and if not, the TID value is passed through, unmasked, by AND gate 918.

If the TID value is passed through by AND gate 918, it is compared to the PID by comparator 906 to determine if a match occurs. A favorable comparison (i.e. a match) results in the output of comparator 906 going high (to a logic level one) and a non-favorable comparison results in the output of comparator 906 going low (to a logic level zero). Therefore, if the PID matches the TID value, the output of OR gate 904 goes high, regardless of the output of comparator 908, and a private address range is indicated. However, if the TID value is forced to all 0's by AND gate 918, the output of comparator 906 goes low to indicate a non-favorable comparison, but the output of comparator 908 goes high to indicate a favorable comparison (i.e. a match). In this case, a shared range is indicated due to the masking of TID. So long as either the output of comparator 906 goes high or 908 goes high, the PID/TID portion of the comparison results in a match.

Figure 10:
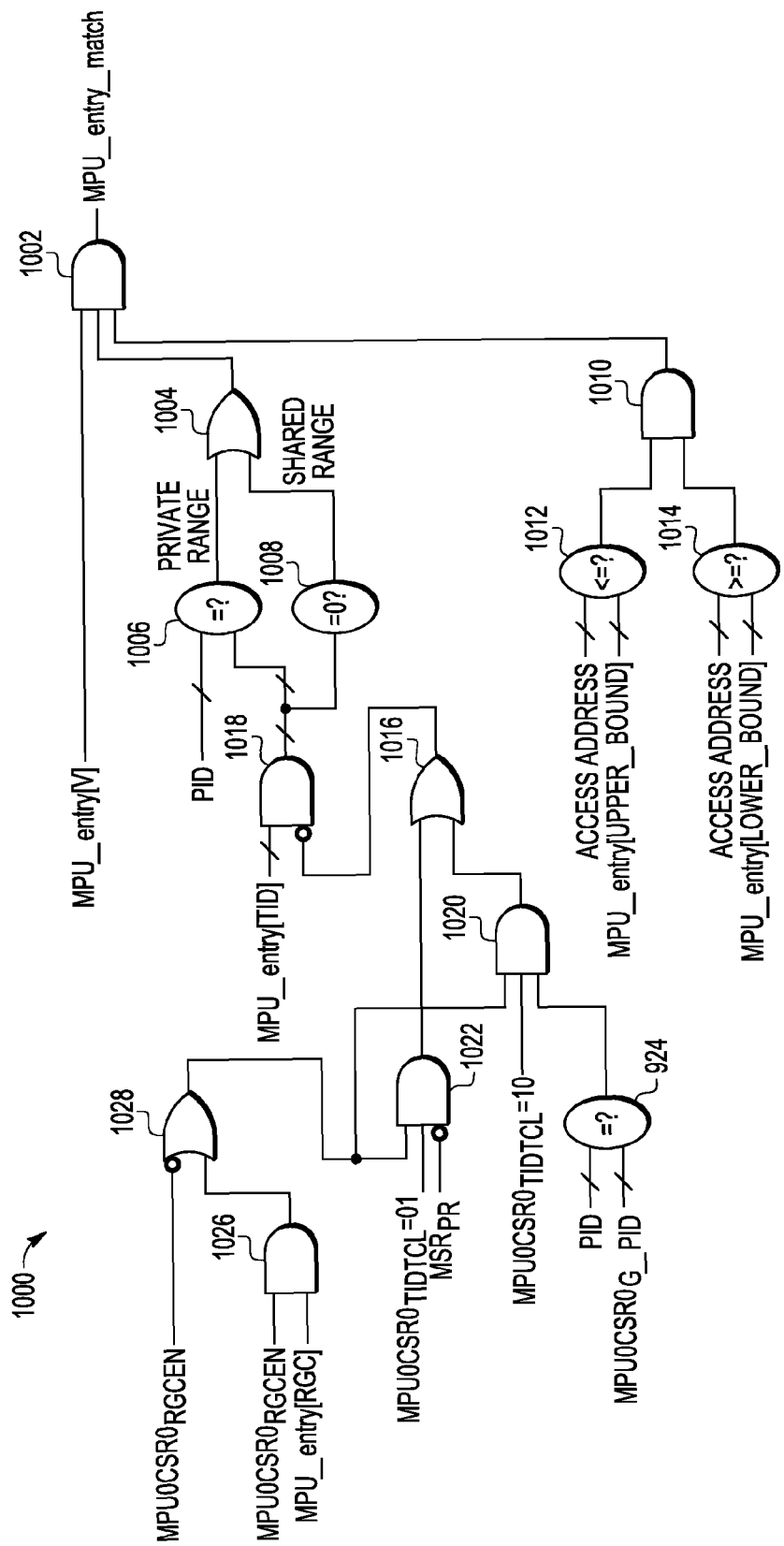
FIG. 10 illustrates region descriptor match logic for a region descriptor entry of the MPU of FIG. 2, in accordance with one embodiment of the present invention.

FIG. 10 illustrates, in partial schematic and partial block diagram form, region descriptor match logic 1000 for an access address and its attributes and how it is compared with the corresponding fields in an MPU entry. Therefore, region descriptor match logic 1000 may also be referred to as the comparison logic and is repeated for each region descriptor entry in MPU 60. The example of FIG. 10 includes use of the G_PID field to control globalization enabling, as in FIG. 9, and further includes use of the RGCEN. Match logic 1000 includes AND gates 1022, 1020, 1018, 1010, 1002, and 1026, OR gates 1016 and 1004, and comparators 1024, 1012, 1014, 1006, and 1008. A first input of AND gate 1002 is coupled to receive the valid bit from the corresponding region descriptor entry (MPU_entry[V]), a second input is coupled to an output of OR gate 1004, and a third input is coupled to an output of AND gate 1010. An output of AND gate 1002 provides a match signal, MPU_entry_match, which indicates whether or not a match condition occurs. For example, if the match signal goes high (to a logic level one), a match for that region descriptor entry has occurred, and if the match signal stays low or goes low (to a logic level zero), a match has not occurred. A first input of OR gate 1004 is coupled to an output of comparator 1006 and a second input of OR gate 1004 is coupled to an output of comparator 1008. Comparator 1006 has a first input coupled to receive the PID of a current access request (which may be provided by, for example, storage circuitry 57) and has a second input coupled to an output of AND gate 1018. AND gate 1018 has a first n-bit input coupled to receive the TID value from the corresponding region descriptor entry (MPU_entry[TID]). A second input of AND gate 1018 is an inverting input coupled to an output of OR gate 1016. A first input of OR gate 1016 is coupled to an output of AND gate 1022. A first input of AND gate 1022 is coupled to an output of OR gate 1028. A first input of OR gate 1028 is an inverting input which is coupled to receive the value of RGCEN from MPU control and status register 700. A second input of OR gate 1028 is coupled to an output of AND gate 1026. A first input of AND gate 1026 is coupled to receive the value of RGCEN from MPU control and status register 700, and a second input of AND gate 1026 is coupled to receive the value of the RGC field of the current descriptor entry. A second input of AND gate 1022 is coupled to receive a first indicator, which, when asserted to a logic level one, indicates that the 2-bit value of the TIDCTL field from MPU control and status register 700 is "01". Therefore, if the value of the TIDCTL field is not "01", the first indicator is a logic level zero. A third input of AND gate 1022 is an inverting input coupled to receive a supervisor/user mode indicator (MSR[PR]). This may correspond to the problem state (PR) of a machine state register (MSR) which may be located, for example, in control registers 56. In the embodiments described herein, a value of 0 for MSR[PR] indicates supervisor mode and a value of 1 indicates user mode. A second input of OR gate 1016 is coupled to an output of AND gate 920. A first input of AND gate 1020 is coupled to the output of OR gate 1028. A second input of AND gate 1020 is coupled to receive a second indicator, which, when asserted to a logic level one, indicates that the 2-bit value of the TIDCTL field from MPU control and status register 700 is "10". Therefore, if the value of the TIDCTL field is not "10", the second indicator is a logic level zero. A third input of AND gate 1020 is coupled to an output of comparator 1024. Comparator 1024 has a first input coupled to receive the current PID (such as from storage circuitry 57) and a second input coupled to receive the G_PID value from MPU control and status register 700. Comparator 1008 has a first input coupled to the output of AND gate 1018. AND gate 1010 has a first input coupled to an output of comparator 1012 and a second input coupled to an output of comparator 1014. Comparator 1012 has a first input coupled to receive the access address of the memory access request and a second input coupled to receive the upper_bound value from the corresponding region descriptor entry (MPU_entry[UPPER_BOUND]). Comparator 1014 has a first input coupled to receive the access address of the memory access request and a second input coupled to receive the lower_bound value from the corresponding region descriptor entry (MPU_entry[LOWER_BOUND]).

In operation, note that the descriptions provided above with respect to gates 916, 918, 906, 908, 904, 912, 914, 910, and 902 above apply to gates 1016, 1018, 1006, 1008, 1004, 1012, 1014, 1010, 1002, respectively. However, in match logic 1000, globalization masking is further qualified by the RGC field of each entry when RGCEN is enabled (e.g. a logic level one). If RGCEN is not enabled (e.g. a logic level zero), then, due to the inverting input of OR gate 1028, the output of OR gate 1028 is a logic level one (regardless of the value at the output of AND gate 1026). In this manner, globalization masking is performed for the entry in accordance with the TIDCTL values. That is, since the output of OR gate 1028 is a logic level one, the output of OR gate 1028 does not affect the output of gates 1022 and 1020, such that the outputs of these gates are determined by the other 2 inputs (which was described above in reference to the analogous circuitry in FIG. 9).

If RGCEN is enabled, then globalization masking for a particular region descriptor is determined by the corresponding RGC field of the region descriptor. If RGCEN is enabled (a logic level one), then the first input to OR gate 1028 is a logic level zero and the output of OR gate 1028 is determined by the output of AND gate 1026. Therefore, if RGCEN is enabled, but the RGC field of the corresponding region descriptor (i.e. entry) is a logic level zero, no globalization masking is performed for the region descriptor. In this case, the output of AND gate 1026 is a logic level zero, and thus the output of OR gate 1028 is also a logic level zero. This ensures that the outputs of AND gates 1022 and 1020, and thus the output of OR gate 1016, are logic level zeros. Therefore, the value of TID is passed, unmasked, via AND gate 1018 to comparators 1006 and 1008. However, if RGCEN is enabled (a logic level 1) and the RGC field of the corresponding region descriptor is 1, then globalization masking is performed for the entry in accordance with the TIDCTL values. In this case, the output of AND gate 1026 and OR gate 1028 is a logic level one, and thus does not affect the output of gates 1022 and 1020, such that the outputs of these gates are determined by the other 2 inputs (which was described above in reference to the analogous circuitry in FIG. 9. Therefore, if RGCEN is enabled and the RGC of a region descriptor is asserted, globalization masking is enabled for that region descriptor so that it may be utilized by other processes whose PID may not match the TID of the region descriptor, in accordance with the value of the TIDCTL field.

Figure 11:
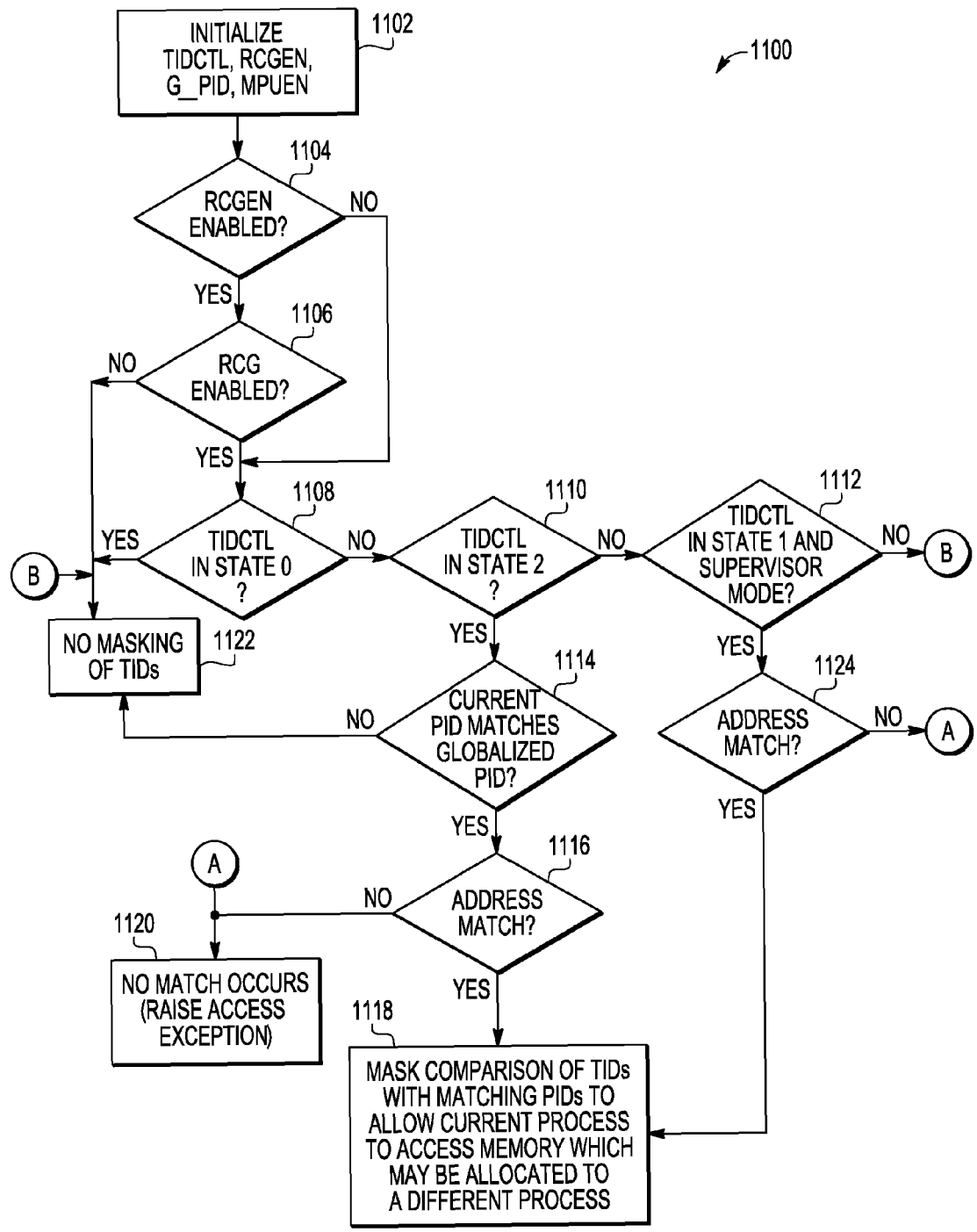
FIG. 11 illustrates, in flow diagram form, a method of operation of the MPU of FIG. 2, in accordance with one embodiment of the present invention.

FIG. 11 illustrates, in flow diagram form, a method 1100 of operation MPU 60 in accordance with one embodiment of the present invention. In the illustrated embodiment of FIG. 11, the RCGEN and G_PID fields of the MPU control and status register (such as MPU control and status register 700) and RGC fields of the region descriptors are present for MPU 60. In the illustrated embodiment, it is assumed that the TIDCTL field of the MPU control and status register (such as MPU control and status register 700) may have at least 3 states (e.g. 00, 01, 10). Method 1100 begins with block 1102 in which the TIDCTL, RCGEN, G_PID, and MPUEN fields are initialized appropriately. For example, an appropriate state may be stored to TIDCTL (e.g. 00, 01, 10, as described in reference to FIG. 8), an appropriate global PID may be stored to G_PID, and the RCGEN may be asserted or negated to either enable or disable, respectively, use of the RGC fields. Each of the RGC fields in the region descriptors of MPU 60 may be initialized when each region descriptor entry is created.

Method 1100 proceeds to decision diamond 1104 in which it is determined if RCGEN is enabled. If RCGEN is not enabled, the method proceeds to decision diamond 1108 in which globalization masking is selectively enabled, based on the value of the TIDCTL field, for each region descriptor in MPU 60. As will be described, decision diamonds 1108, 1110, and 1112 determine whether or not globalization masking is to be performed for a particular memory region corresponding to the region descriptor. If, at decision diamond 1104, RGCEN is enabled, flow proceeds to decision diamond 1106 in which it is determined, for each region descriptor, if the corresponding RGC is enabled. Method 1100 then proceeds to decision diamond 1108 in which the determination of whether or not to perform globalization masking in accordance with the TIDCTL value (corresponding to decision diamonds 1108, 1110, and 1112) is only performed for those region descriptors whose RGC field is enabled. For all other region descriptors whose RGC is not enabled, the TID comparison is performed normally such that the current PID needs to match the TID of a region descriptor for a match condition to occur, as was described above.

At decision diamond 1108, for those region descriptors for which globalization is enabled (all if RGCEN is not enabled, or only those who have the RGC field enabled if RGCEN is enabled), it is determined if the TIDCTL field is in state 0. In one embodiment, state 0 may correspond to the value of "00" described in reference to FIG. 8. If so, method 1100 continues to block 1122 in which no masking of the TID occurs. In this case of no masking, the TID comparisons are performed normally for determining a match condition. If, at decision diamond 1108, the TIDCTL field is not in state 0, method 1100 proceeds to decision diamond 1110 in which it is determined if the TIDCTL field is in state 2. In one embodiment, state 2 may correspond to the value of "10" described in reference to FIG. 8. If so, method 1100 continues to decision diamond 1114 in which it is determined if the current PID corresponding to the current memory access request matches the globalization PID (G_PID of the MPU control and status register). If not, the method proceeds to block 1122 in which no masking of the TID is performed for that region descriptor. If so, the method proceeds to decision diamond 1116 in which it is determined if the address of the current memory access request matches the region of memory corresponding to the region descriptor (by using the UPPER_BOUND and LOWER_BOUND fields of the region descriptor). If, at decision diamond 1116, there is no address match, method 1100 proceeds to block 1120 in which no match condition occurs for that entry. In some cases, an access exception may be raised (such as if no match occurs with any region descriptor of MPU 60). If, at decision diamond 1116, there is an address match, method 1100 proceeds to block 1118 in which the method masks comparisons of TIDs to allow a current process to access memory which may be allocated to a different process (by a region descriptor of MPU 60).

If, at decision diamond 1110, the TIDCTL field is not in state 2, method 1100 continues to decision diamond 1112 in which it is determined if the TIDCTL field is in state 1 (which may correspond to a TIDCTL value of "10" as described in reference to FIG. 8) and the processor is operating in supervisor mode. If not, method 1100 continues, via point B, to block 1122 in which no masking is performed. If so, method 1100 continues to decision diamond 1124 in which it is determined if an address of the current memory access request matches the region of memory corresponding to the region descriptor. If not, method 1100 continues, via point A, to block 1120. If an address match does occur, method 1100 continues to block 1118 in which the method masks comparisons of TIDs with matching PIDs to allow a current process to access memory which may be allocated to a different process.

Therefore, by now it can be appreciated how globalization masking may be implemented such that a process executing on a processor may be able to access a region in memory that is allocated, by way of an MPU region descriptor, to a different process. In this manner, globalization masking allows for a portion of a region descriptor, such as the TID of a region descriptor, to not be utilized in determining a match condition. For example, when globalization masking is performed for the TID, the process identifier of the current process need not match the TID of the region descriptor which corresponds to the region of memory being accessed. In one embodiment, if globalization masking is enabled, the current process can have any PID value since the TID of the region descriptor is forced to zeros and effectively removed from the region descriptor comparison. Alternatively, if globalization masking is enabled, the current process should match a global PID rather than the TID corresponding to the region being accessed. Furthermore, through the use of additional controls, such as the RGC fields of the region descriptors, globalization masking may be performed for a subset of region descriptors within the MPU. In this manner, more control can be given to particular software, such as supervisor code, without increasing processing time or the number of entries in the MPU.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 100 are circuitry located on a single integrated circuit or within a same device. Alternatively, system 100 may include any number of separate integrated circuits or separate devices interconnected with each other.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

Item 1 includes a computer processing system having a memory protection unit (MPU); a plurality of region descriptors associated with the MPU, wherein the region descriptors include address range and translation identifier values for a respective region of memory; a translation identifier control indicator (TIDCTL); and control logic operable to determine whether the translation identifier control indicator is in a first state, and if the translation identifier control indicator is in the first state, allow a first process being executed by the processing system to access a memory region allocated to a second process of the processing system. Item 2 includes the system of item 1, wherein the control logic masks a portion of one or more of the plurality of region descriptors corresponding to the second process if the translation identifier control indicator is in the first state. Item 3 includes the system of item 2, wherein the portion of the region descriptor that is masked is a translation identifier value (TID). Item 4 includes the system of item 1, and further includes a region globalization control enable indicator (RGCEN); a process identifier (PID); and control logic operable to determine whether the region globalization control enable indicator is in a first state, and if the region globalization control enable indicator is not in the first state, allow the first process to access the memory region allocated to the second process according to whether the TIDCTL indicator is in the first state. Item 5 includes the system of item 4 and further includes the region descriptors include a region globalization control indicator (RGC) that indicates whether a respective region descriptor can be utilized by other processes when the globalization indicator is in a first state. Item 6 includes the system of item 1 and further includes a globalization PID (G-PID) field in a control register; and control logic operable to use globalization masking for translation identifier (TID) comparisons when the translation identifier control indicator is in the first state, and a process identifier (PID) value of the first process matches a value in the G_PID field. Item 7 includes the system of item 1 and further includes control logic operable to use globalization masking for translation identifier (TID) comparisons when the translation identifier control indicator is in the first state and the first process is in supervisor mode. Item 8 includes the system of item 1 and further includes a memory protection unit enable (MPUEN) indicator in a control register, wherein when the MPUEN indicator is in a first state, access addresses of the first process are compared to addresses in one or more of the plurality of region descriptors to determine whether there is a match. Item 9 includes the system of item 8, wherein when no match is detected, and an access type is not enabled to bypass MPU protections, then an exception condition is signaled for an access attempt.

Item 10 includes a computer processing system having a memory protection unit (MPU); a control register including a globalization process identifier (G_PID) field; a plurality of region descriptors associated with the MPU, wherein at least one of the region descriptors is allocated to a first process; and control logic operable to allow the first process to access a region of memory allocated for a second process when a process identifier (PID) for the first process matches a value in the G_PID field. Item 11 includes the system of item 10 and further includes a translation identifier control indicator (TIDCTL); and control logic operable to mask translation identifier values (TIDs) in one or more of the plurality of region descriptors for the first and second processes when the translation identifier control (TIDCTL) indicator is in a first state and the first process is in supervisor mode. Item 12 includes the system of item 10, wherein the control logic masks a portion of a region descriptor used for the second process if a translation identifier control indicator (TIDCTL) is in a first state. Item 13 includes the system of item 12, wherein the portion of the region descriptor that is masked is a translation identifier value (TID). Item 14 includes the system of item 12 and further includes one or more of the plurality of region descriptors include a region globalization control indicator (RGC) that indicates whether a memory region defined in the respective region descriptor can be utilized by other processes. Item 15 includes the system of item 14 and further includes the control register includes a region globalization control enable indicator (RGCEN); and control logic operable to determine whether the region globalization control enable indicator is in a first state, and if the region globalization control enable indicator is not in the first state, allow the first process to access the memory region allocated to the second process according to whether the TIDCTL indicator is in the first state. Item 17 includes the system of item 14 and further includes initializing a memory protection unit enable (MPUEN) indicator in the control register, wherein when the MPUEN indicator is in a first state, comparing access addresses to an address range specified in one or more of the plurality of region descriptors to determine whether there is a match; and when no match is detected, and an access type is not enabled to bypass MPU protections, then an exception condition is signaled for an access attempt.

Item 18 includes a method including initializing a translation identifier control (TIDCTL) indicator in a control register of a memory protection unit (MPU) in a computer system; and when the TIDCTL indicator is in a first state, masking translation identifier comparisons in one or more of a plurality of region descriptors of the MPU for first and second processes to allow the first process to access a memory region allocated to the second process. Item 19 includes the method of item 18 and further includes initializing a region globalization control enable (RGCEN) indicator in the control register; and when the RGCEN and TIDCTL indicators are both in a specified state, the masking the translation identifiers is performed based on whether a region globalization control (RGC) indicator in the region descriptor for the second process is in a specified state. Item 20 includes the method of item 18 and further includes initializing a globalization process identifier (G_PID) in the control register to specify a process identifier (PID) for the second process; and initializing a memory protection unit enable (MPUEN) indicator in the control register, wherein when the MPUEN indicator is in a first state, comparing access addresses to address ranges defined by one or more of the plurality of region descriptors to determine whether there is a match.

What is claimed is:

1. A computer processing system comprising:
a memory protection unit (MPU);
a plurality of region descriptors associated with the MPU, wherein the region descriptors include address range and translation identifier values for a respective region of memory;
a translation identifier control indicator (TIDCTL); and
control logic operable to determine whether the translation identifier control indicator is in a first state, and if the translation identifier control indicator is in the first state, allow a first process being executed by the processing system to access a memory region allocated to a second process of the processing system.

2. The system of claim 1 wherein:
the control logic masks a portion of one or more of the plurality of region descriptors corresponding to the second process if the translation identifier control indicator is in the first state.

3. The system of claim 2 wherein:
the portion of the region descriptor that is masked is a translation identifier value (TID).

4. The system of claim 1 further comprising:
a region globalization control enable indicator (RGCEN);
a process identifier (PID); and
control logic operable to determine whether the region globalization control enable indicator is in a first state, and if the region globalization control enable indicator is not in the first state, allow the first process to access the memory region allocated to the second process according to whether the TIDCTL indicator is in the first state.

5. The system of claim 4 further comprising:
the region descriptors include a region globalization control indicator (RGC) that indicates whether a respective region descriptor can be utilized by other processes when the globalization indicator is in a first state.

6. The system of claim 1 further comprising:
a globalization process identifier (G_PID) field in a control register; and
control logic operable to use globalization masking for translation identifier (TID) comparisons when the translation identifier control indicator is in the first state, and a process identifier (PID) value of the first process matches a value in the G_PID field.

7. The system of claim 1 further comprising:
control logic operable to use globalization masking for translation identifier (TID) comparisons when the translation identifier control indicator is in the first state and the first process is in supervisor mode.

8. The system of claim 1 further comprising:
a memory protection unit enable (MPUEN) indicator in a control register, wherein when the MPUEN indicator is in a first state, access addresses of the first process are compared to addresses in one or more of the plurality of region descriptors to determine whether there is a match.

9. The system of claim 8 further wherein:
when no match is detected, and an access type is not enabled to bypass MPU protections, then an exception condition is signaled for an access attempt.

10. A computer processing system comprising:
a memory protection unit (MPU);
a control register including a globalization process identifier (G_PID) field;
a plurality of region descriptors associated with the MPU, wherein at least one of the region descriptors is allocated to a first process; and
control logic operable to allow the first process to access a region of memory allocated for a second process when a process identifier (PID) for the first process matches a value in the G_PID field.

11. The system of claim 10 further comprising:
a translation identifier control indicator (TIDCTL); and
control logic operable to mask translation identifier values (TIDs) in one or more of the plurality of region descriptors for the first and second processes when the translation identifier control (TIDCTL) indicator is in a first state and the first process is in supervisor mode.

12. The system of claim 10 wherein:

the control logic masks a portion of a region descriptor used for the second process if a translation identifier control indicator (TIDCTL) is in a first state.

13. The system of claim 12 wherein:

the portion of the region descriptor that is masked is a translation identifier value (TID).

14. The system of claim 12 further comprising:

one or more of the plurality of region descriptors include a region globalization control indicator (RGC) that indicates whether a memory region defined in the respective region descriptor can be utilized by other processes.

15. The system of claim 14 further comprising:

the control register includes a region globalization control enable indicator (RGCEN); and control logic operable to determine whether the region globalization control enable indicator is in a first state, and if the region globalization control enable indicator is not in the first state, allow the first process to access the memory region allocated to the second process according to whether the TIDCTL indicator is in the first state.

16. The system of claim 14 further comprising:

initializing a memory protection unit enable (MPUEN) indicator in the control register, wherein when the MPUEN indicator is in a first state, comparing access addresses to an address range specified in one or more of the plurality of region descriptors to determine whether there is a match; and when no match is detected, and an access type is not enabled to bypass MPU protections, then an exception condition is signaled for an access attempt.

17. A method comprising:

initializing a translation identifier control (TIDCTL) indicator in a control register of a memory protection unit (MPU) in a computer system; and when the TIDCTL indicator is in a first state, masking translation identifier comparisons in one or more of a plurality of region descriptors of the MPU for first and second processes to allow the first process to access a memory region allocated to the second process.

18. The method of claim 17 further comprising:

initializing a region globalization control enable (RGCEN) indicator in the control register; and when the RGCEN and TIDCTL indicators are both in a specified state, the masking the translation identifiers is performed based on whether a region globalization control (RGC) indicator in the region descriptor for the second process is in a specified state.

19. The method of claim 17 further comprising:

initializing a globalization process identifier (G_PID) in the control register to specify a process identifier (PID) for the second process; and initializing a memory protection unit enable (MPUEN) indicator in the control register, wherein when the MPUEN indicator is in a first state, comparing access addresses to address ranges defined by one or more of the plurality of region descriptors to determine whether there is a match.

* * * * *